US008806635B2

(12) United States Patent
Bennett (10) Patent No.: US 8,806,635 B2
(45) Date of Patent: *Aug. 12, 2014

(54) SERVER BASED MALWARE SCREENING (71) Applicant: Enpulz, L.L.C., Chicago, IL (US)

(72) Inventor: James D. Bennett, Hroznetin (CZ)

(73) Assignee: Enpulz, L.L.C., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,103

(22) Filed: Oct. 15, 2012

(65) Prior Publication Data

US 2013/0042324 A1    Feb. 14, 2013

Related U.S. Application Data (63) Continuation of application No. 12/372,571, filed on Feb. 17, 2009, now Pat. No. 8,291,496.

(60) Provisional application No. 61/052,538, filed on May 12, 2008.

(51) Int. Cl.
*G06F 11/00*    (2006.01)
*H04L 29/06*    (2006.01)
*G06F 21/56*    (2013.01)

(52) U.S. Cl.
CPC .......... *H04L 63/145* (2013.01); *H04L 63/1408* (2013.01); *G06F 21/56* (2013.01)
USPC ........................................................ 726/23

(58) Field of Classification Search
USPC ............................................................. 726/23
See application file for complete search history.

(56) References Cited

U.S. PATENT DOCUMENTS

| 7,150,042 | B2 * | 12/2006 | Wolff et al. ...................... 726/22 |
| 8,214,895 | B2 * | 7/2012 | Kuo et al. ........................ 726/22 |
| 2003/0110391 | A1 * | 6/2003 | Wolff et al. .................... 713/200 |
| 2003/0145228 | A1 * | 7/2003 | Suuronen et al. ............. 713/201 |
| 2009/0083852 | A1 * | 3/2009 | Kuo et al. ........................ 726/22 |

* cited by examiner

*Primary Examiner* — Teshome Hailu
*Assistant Examiner* — Abiy Getachew
(74) *Attorney, Agent, or Firm* — Garlick & Markison; Bruce E. Garlick (57) ABSTRACT An Internet infrastructure is provided to transfer a packet of data between a client device and source device. The infrastructure consists of a support server that screens the packet for malware codes on behalf of a registered client. In order to scan for malware, the support server contains hardware and/or software modules to perform malware detection and quarantine functions. The modules identify malware bit sequence in the packet(s), malware bit sequences or entire contaminated code is quarantined or repaired as appropriate. After identification of malware code (if any), the support server sends warning messages to affected parties, providing information regarding the malware codes that were detected.

20 Claims, 9 Drawing Sheets

SERVER BASED MALWARE SCREENING

CROSS REFERENCE TO PRIORITY APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility patent application for all purposes:

1. U.S. Utility application Ser. No. 12/372,571, entitled "Server Based Malware Screening," filed Feb. 17, 2009, to be issued as U.S. Pat. No. 8,291,496, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 61/052,538, entitled "Server Based Malware Screening," filed May 12, 2008.

BACKGROUND

1. Technical Field

The present invention relates generally to Internet infrastructures; and, more particularly, to malware/virus screening.

2. Related Art

Malware codes that disrupt normal functioning of client devices or servers include virus codes, adware codes, spyware codes, worm codes, Trojan horse codes, and illegal data, content, and distributions. Affected client devices can include personal or laptop computers, set top boxes, handheld data/communication devices, cell phones, game consoles, and other client devices, for example. Client devices and servers often, in such unrestrained environments, become easy targets of malware codes.

In addition, many client devices or servers also become, intentionally or unintentionally, sources of such malware codes over the Internet or other networks. Often, once infected, malware repeatedly infects connected Internet infrastructure by replicating itself in client devices or servers without the knowledge of the users and IT professionals monitoring the equipment/devices. These malware codes often disrupt many client devices within a short period of time, often before most client devices are able to detect and handle them. A typical mode of malware code transmission and distribution includes embedding of viral code or malware data in uploads, downloads, transmission, receipt, etc., of web page(s) and files over the Internet, intranet, or other networks.

Client devices or servers are typically incapable of eliminating such packets or packet flow that contains malware, because many users do not take the time to install complex and performance degrading commercial virus software like Adaware, Norton utilities, McAfee, etc. For example, children and unsuspecting adults are offered with deceptive buttons, downloads, and other interfaces that when pressed or downloaded function in a manner that is not agreeable to the user or users. These malware codes may even transfer or steal personal data to unknown servers, which may be misused or be used in criminal or illegal conduct.

In other cases, users of client devices install virus detection, quarantining, and/or removal software packages such as Adaware, Norton, McAfee, and/or other software. A disadvantages of these packages running in client devices include negative affect on device performance, huge purchase and maintenance cost, inability maintain the software in a current and effective state over time, and needing to go through the laborious and time-consuming process of screening all of the files in client device periodically often using the computer resources of the machine full time. Not all of these packages consider the restrictions that a user would want to place on Internet trafficking, such as in case of children use where a parent may want to include in the malware lists various sites that contain adult content, illegal content, and adult distributions or discussions.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
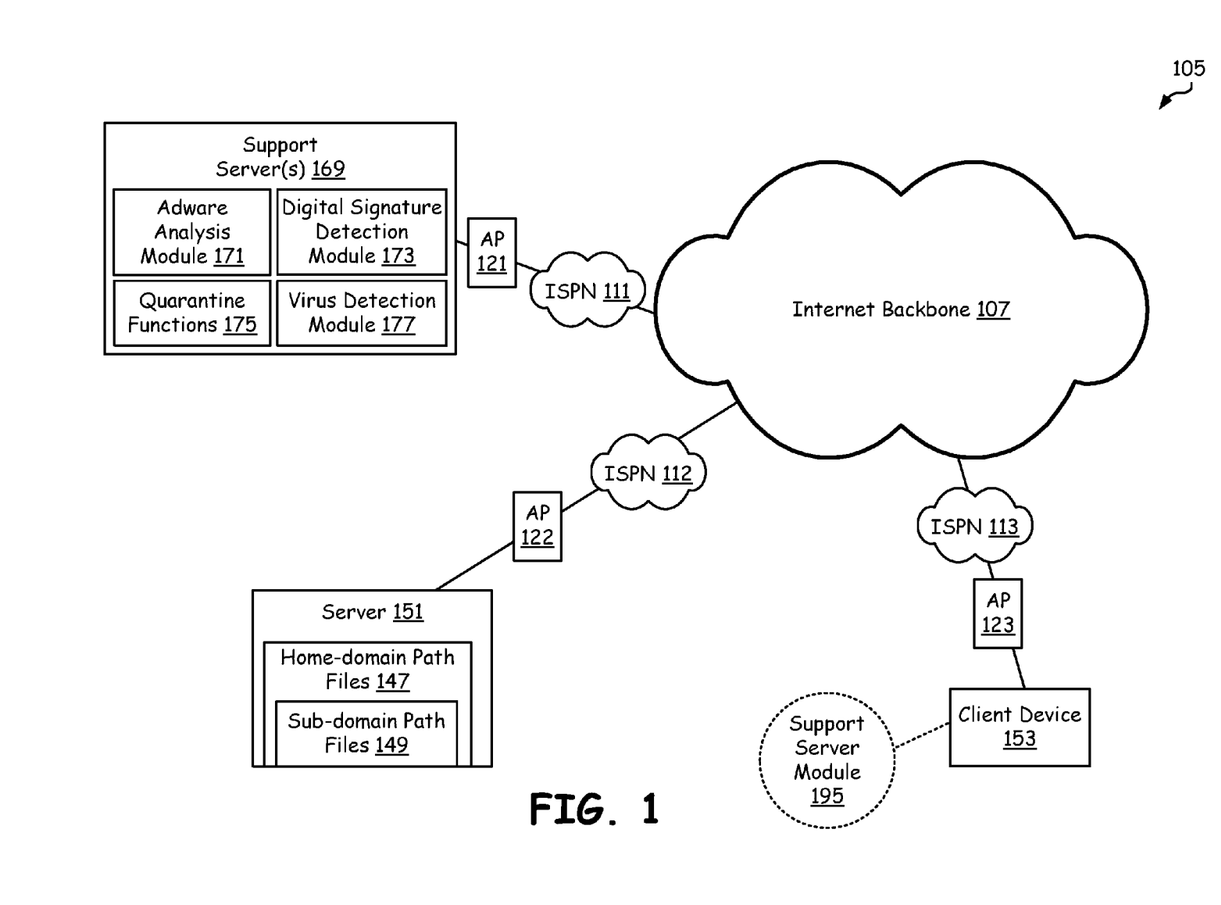
FIG. 1 is a schematic block diagram illustrating an Internet infrastructure containing at least one client device and at least one server and at least one support server(s), wherein the support server(s) perform malware screening on behalf of the client device and server, during download or upload operations.

FIG. 1 is a schematic block diagram illustrating an Internet infrastructure 105 containing at least one client device 153, at least one server 151, and at least one support server(s) 169, wherein the support server(s) 169 perform malware screening on behalf of the client device 153 and server 151, during download or upload operations. The support server(s) 169 may be additional server devices separate from the server(s) 151, dedicated blades within the server(s) 151, dedicated CPUs, virtual machines within a server 151, dedicated server units or rack systems, a workstation, a cluster of personal computers (PCs), or other apportionment of computer and storage resources from within a server farm. Mainly, the support servers(s) 169 are used to screen for the presence of malware on behalf of the client devices, such as client device(s) 153, and servers (source devices), such as server(s) 151. By using a dedicated or at least a more-focused device or server construct to focus on malware detection and elimination within the system of FIG. 1, a central location can be kept up-to-date and as efficient as possible, especially when these other servers, client devices, computing devices, etc., are not adequately protected with up-to-date or exhaustive malware detection and analysis software (or may not have the computer power or resources to engage in such extensive malware detection). While screening transmit and/or receive data packets, these support server(s) 169 attempt to identify malware bit sequences and logic flows in the streams of data that are coming and going to and from the client devices servers. When malware codes are detected in packets that are routed for clients and/or servers via the support server(s) 169 during uploading from the client device 153 or downloading to the client device 153 from the server 151, the support server(s) 169 quarantine the packets, terminate the transmission, delete offending code/data, and/or tries to purge the malware from the system before commencing more transfers. When malware is detected, the support server(s) 169 sends a warning message to either or both of the server 151 and client device 153, and may elect to immediately notify IT professionally responsible for the server farm or network, to enable more rigorous human intervention into the malware issue that was just detected. In one embodiment, the server 151 may be server clusters containing home-domain path files 147 and sub-domain path files 149.

The support server(s) 169, server 151, and client device 153 may be geographically located anywhere and are connected to an Internet backbone 107 via ISPNs (Internet Service Provider's Networks) such as 111, 112 and 113 and APs (Access Points) such as 121, 122 and 123. Connection to the intranet, Internet, networks, etc., may be done through wireless, wireline, optical, or other protocols. The support server(s) 169 contain independent server applications designed specifically for detecting and handling the presence of malware, such as adware analysis module 171, digital signature detection module 173, quarantine functions 175, and virus detection module 177. These components or modules 171, 173, 175 and 177 allow support server(s) 169 to screen for malware codes in the packets being transmitted to and from Internet-coupled devices, and quarantines, destroys, removes, or otherwise prevents the threat of malware, once detected. The support server(s) 169 also have quarantine storage areas (not specifically shown in FIG. 1) to quarantine packets, programs, data, or content that contain malware codes, and the server(s) 169 contain communication applications (refer to FIG. 2) that assist in sending warning messages that can then trigger or be associated with a human challenge mechanism to override, further process, question, enhance, or otherwise compliment the recent malware detection.

The quarantine and communication application functionalities selectively include, but are not limited to, sending messages to the server 151 and/or client device 153 when malware is detected, sending the server 151 and/or client device 153 "human challenge" mechanisms/options when malware is encountered, and/or interrupting, destroying, quarantining, or aborting the delivery of the underlying packets when malware is present. As used herein, the term "malware" also includes unwanted or inappropriate adware, spyware, Trojan horses, virus files, or any other code or data that is unwanted or harmful to the Internet, users, clients, severs, etc. "Illegal content" include content banned by laws of a state or country such as gambling, child pornography, etc., or content that is commissioned in furtherance of some crime such as drug trafficking or money laundering. "Illegal distribution" relates to the unauthorized distribution of otherwise legal content, such as unauthorized distribution of copyrighted materials, like stolen MP3 code, stolen PDFs, unauthorized use of artwork on the Internet, etc. Together, malware, illegal content, and content sent via illegal distribution are generally referred to herein as or be part of "malware codes/data." Malware codes may also comprise the program codes of a virus, worm, and Trojan horses or may simply be the unwanted adware. These malware codes are characterized by their ability to disrupt normal functioning of client device 153, such as slowing down the device or impeding certain useful functionality, annoying the users by unwanted popup and advertisements, channeling private or confidential information outside of the device in unwanted or covert manners, changing user set characteristics of the device, changing the registry, destroying data or engaging in other vandalism on a computer device, etc. In other words, the above mentioned malware may include virus codes or virus bit sequences, adware codes or adware bit sequences, spyware codes or spyware bit sequences, worm codes or worm bit sequences, Trojan horse codes or Trojan horse bit sequences, and/or any forms of illegal content and/or distribution in isolation or in any combination.

The messages sent by the communication applications to end users, client devices, IT professionals, governing police or government authorities, or servers may include a title such as "Malware Warning!", and a brief description of the type of the malware, sender's and receiver's IP address and/or domain names, type of malware, risk factor(s), extent of infection, types of remediation to be performed/recommended, and some other details as desired. In addition, the message may give a brief description of the status or situation currently encountered by the support server(s) 169, such as—"The download webpage/file is being processed for malware, please wait . . . " or when a malware is detected—"Sorry, the server may be sourcing malware, file/web page can not be downloaded . . . " or "The file being sent may contain a malware code . . . ". The message may also include information relating to the risk factors, preventative measures, and actions/characteristics of the malware, such as "<<Malware type and Code Number>>: with HIGH RISK FACTOR, affects your PC registry and may disable <<one or more application related activities>>" and "<<Malware type and Code Number>>: with MEDIUM RISK FACTOR, produces annoying and misleading popup."

The human challenge is when a client user, server administrator, agency, or IT professional can access the malware detection and situation, and change, augment, override, or otherwise change the course of the actions of the support server(s) 169 once a malware event is detected. A human challenge may provide a few digits or alphabetics with orientations unlike alphanumeric displays of the computer to verify that a real user is engaged in the human challenge and that the challenge is not also being thwarted by a viral attack. With the provision of the few digits or alphabetic characters, and a human user is expected to respond by keying in these alphanumeric characters to either change the course of the malware detection and correction protocol within the server(s) 169 and/or give approval for transmission of such packets. This procedure allows a human user to correct for system over-sensitivity to malware or mistakes by the system, as some code identified as malware may in fact not be harmful code, may be an error, or may be virus-like software that is actually beneficial to a user or part of a widely circulated and used commercial software package. In these cases, transmission of packets that are not necessarily malicious or misleading but erroneously detected as such by the system may be transmitted. These code segments may appear as malware because they may have similar file names or code segments, but in fact are user-valued data and/or content. Also, a human challenge may allow the support server(s) 169 to pass on files that are malware affected, with consent. In some cases, for example, IT professionals do want to transfer a malware instance to another IT professional, authorities, universities for study, virus experts, etc, to be handled with care or specially processed for preventative analysis.

The digital signature detection module 173 within server(s) 169 of FIG. 1 searches content, files, data streams, communicated data, and the like for prior authenticated digital signatures (which are authenticated by the support server(s) 169 or some other trusted server or servers). The presence and authentication of digital signature(s) indicates that the download or upload file has been previously analyzed, has with certainty not changed state at all since last analyzed, whereby there is no need to reanalyze the content for malware. Since this data, content, files, executable, etc. has been processed and can be ensured to be in an unchanged state since it was last malware processed, this transmission contains malware-clean or malware-free files, pages, downloads, and/or uploads. In such cases where a mal-free-indicating digital signature is attached to the packets, the support server(s) 169 can choose to bypasses the packets from malware screening, thereby saving power, time, and resource consumption. The support server(s) 169 merely check the packets for digital signature, checksums, signature analyzer sequences, secure codes, patterns, etc., that ensure that the packet contents are not changed since the digital signature is attached and authenticate a source or process that is sufficient for ensuring mal-ware free status, and once found, the server can bypass other routine malware detection and correction operations that it would usually have performed. Any alteration or revisions of packets (or files) that is detected by the server(s) 169 would trigger a reset in the digital signature and be an indication that something may have been tampered with or corrupted in the transfer in a manner where malware detection should again be performed before presenting the data/content being downloaded to a server, client, or user. For example, if a file is downloaded from the server 151 by more than one user and a clean digital signature is attached by the support server(s) 169 (a trusted server within the system) once, it may not be necessary to verify for malware codes during the later downloads of the file by other users or systems if the file is sent and received in an uncorrupted or unchanged state.

The support server(s) 169, in order to perform quarantine processing, may have to decrypt packets if they are encrypted. Therefore, if the packets that arrive at a support server 169 are encrypted and if further malware analysis is indicated, then, the support server 169 proceeds with decryption of the packet so that malware detection can be correctly performed on the un-encrypted content. In these cases, the public key may be made available either from the server 151 or the client device 153, however, the private key remains known only to the client device 153.

In another embodiment, a proxy support server(s) or screening server (refer to FIG. 3 for detailed description) performs the function of malware detection. The client device 153 is registered with the proxy support server(s) in order to get the upload or download files screened for malware in a proxy mode. All browser requests of the client device 153 pass through the screening server for encapsulation and delivery to the server 151, when in proxy mode. In essence, the client device can be a thin client or dumb terminal as it comes to malware, because the server(s) 169 in FIG. 1 will perform all malware detection and prevention for the client with the client having no need for client-resident malware software. In yet another embodiment, the client device 153 forwards downloaded files to the screening server(s) for clearance before placing the files into memory space where the malware can cause harm. Basically, the client may receive data in a quarantine area of memory that is isolated or limited in function to prevent virus harm from occurring. The client then transfers the downloaded content from the quarantine space to the server 169 for malware processing. If a malware-free determine is made by the server 169, then the client can release the downloaded content from the quarantine space and into the functional memory area of the client. Else, if malware is detected, then corrective action can be taken either by the client, the server 169, or some other device. In essence, the screening server(s) screen the packets of the client download either in line with the client download or off-path from the client download for malware, and the server sends warning messages with human challenge mechanism or engages in or triggers other malware corrective measures if malware codes are detected.

An example might involve sending, by either a client device 153 or a server 151, a packet that is received by the support server(s) 169 in-line with the transmission or sent the content indirectly and/or in parallel from the normal content transmission. One or more of the support server(s) 169 detects the packet's source or destination address with the current IP address of the server 151, and responds by invoking one of the quarantine functions 175 and communication applications. For example, parents of a teenager may utilize the service of the support server(s) 169 to ensure that only web content that are not harmful to a teenager is allowed to pass through.

Figure 2:
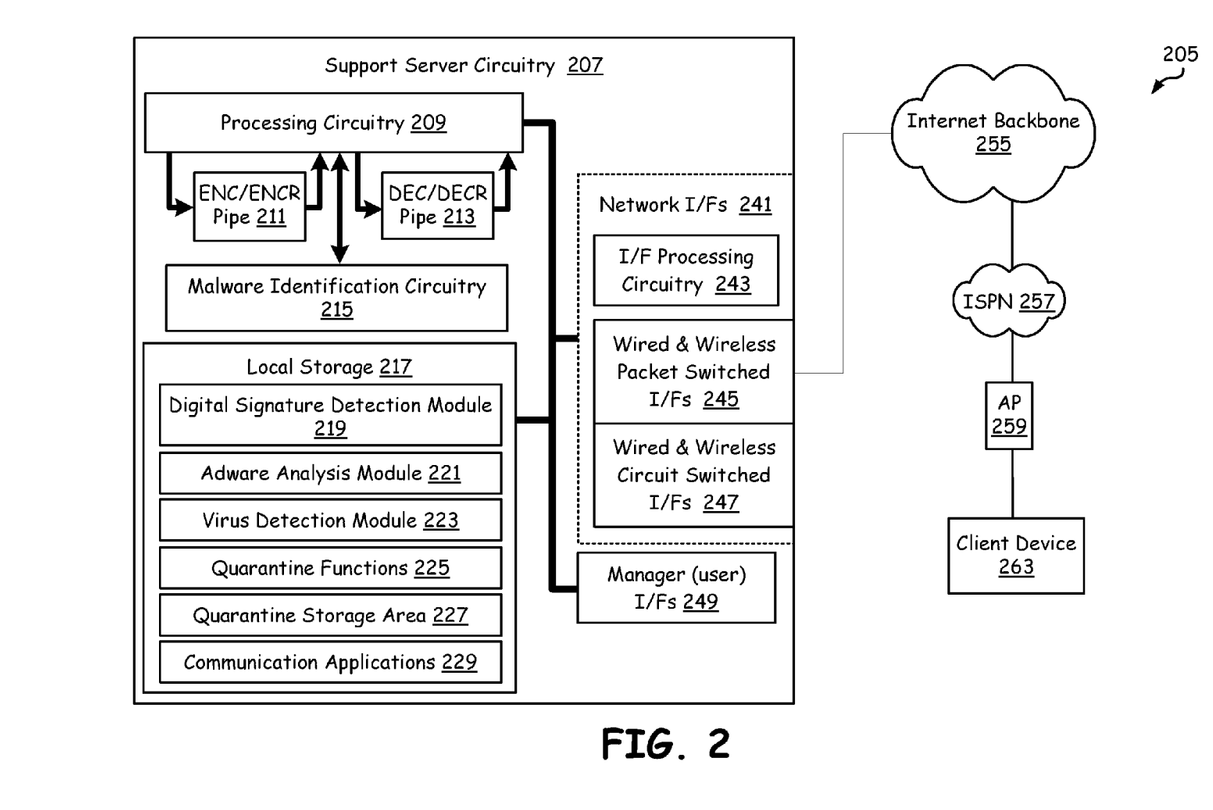
FIG. 2 is a schematic block diagram illustrating components of the support server constructed in accordance with the embodiment of FIG. 1.

FIG. 2 is a schematic block diagram illustrating components of the support server(s) 169 constructed in accordance with the embodiment of FIG. 1. In addition, the illustration 205 shows an Internet backbone 255 that communicatively couples the support server 207 (similar to server 169 of FIG. 1) to a client device 263 via an ISPN 257 and AP 259. The support server circuitry 207 may in part or full be incorporated into any computing device that is capable of serving as an Internet based server. The support server circuitry 207 generally includes processing circuitry 209 (usually, one or more central processing units (CPUs)), local storage 217 (usually some combination of random access memory, hard drives, non-volatile memory, and other memory devices suitable for computer storage and use), manager interfaces 249, and network interfaces 241 which may any one or more of wireless, wireline, optical or another communication protocol. These components communicatively coupled to one another via one or more of a system bus, dedicated communication pathways, or other direct or indirect communication pathways. The processing circuitry 209 may be, in various embodiments, a microprocessor, one or more CPUs, a digital signal processor, one or more graphics processors, a state machine, an application specific integrated circuit (ASIC), a field programming gate array (FPGA), any number of combination thereof, or other processing circuitry. The processing circuitry 209 is communicatively coupled to an encoding/encryption pipe 211, a decoding/decryption pipe 213, and malware identification circuitry 215. These hardware components 211, 213, and/or 215 may be hardwired to increase the speed of malware identification and quarantining, may be firmware or software running on the processing circuitry 209 or other hardware, or may be some combination of hardware and software.

Local storage 217 may be static random access memory (SRAM), dynamic random access memory (DRAM), read-only memory (ROM), flash memory, electrically erasable programmable read only memory (EEPROM or EPROM), a disk drive, RAID arrays, an optical drive, magnetic memory, any combination thereof, or another type of memory that is operable to store computer instructions and data. The local storage 217 contains virus detection module 223 that analyses incoming packets and identifies and confirms virus codes or virus bit sequences or any other malware bit sequences, logic, flow, or presence. Then, appropriate quarantine, repair, destruction, or other functions 225 are applied using a quarantine storage area 227 which is isolated or secure parts of local storage 217 where viruses or other malware can reside and not cause harm to the surrounding software, data, programs, and/or hardware. The communication applications 229 allow messages and human challenge to be displayed on the screen of the client device 263, such as a popup window, within or outside a browser. Similarly, local storage 217 also contains adware analysis module 221 that analyses incoming packets and identifies and confirms adware codes or adware bit sequences or spyware bit sequences. A dedicated quarantine storage area 227 allows these malware-containing packets to be quarantined either on or off of the server circuitry 207.

A digital signature detection module 219 searches for digital signatures that indicate the authenticity and malware-free state of the downloaded or uploaded files/data. The digital signature may be attached to the packets, file, or data by a trusted site, or by the support server 207 in agreement with a source device. Such prior authenticated clean files, pages, downloads and/or uploads that contain authenticated digital signatures may be bypassed from malware screening to save time, resources, heat, power, etc., within the server farm. The support server 207 checks the packets only for authenticity of digital signature that ensure that the packet contents are not changed since the digital signature is attached.

In addition, the network interfaces 241 contain wired and/or wireless (or other) packet switched interfaces 245, wired and/or wireless (or other) circuit switched interfaces 247 and further the network interfaces 241 may also contain built-in or an independent interface processing circuitry 243. The network interfaces 241 allow network/Internet devices to communicate with other network/Internet devices and allow processing circuitry 209 to receive and send packets, which may contain malware code sequences. The manager interfaces 249 may include a display and keypad interfaces for an IT or other human user to interface. These manager interfaces 249 allow the user at the support server 207 to control aspects of the system of FIG. 2.

In other embodiments, the support server 207 of FIG. 2 may include fewer or more components than are illustrated as well as lesser or further functionality. In other words, the illustrated support server is meant to merely offer one example of possible functionality and construction whereby other configurations are possible. As an example thereof, another possible embodiment of a support server that can be used as server(s) 169 in FIG. 1 is described with reference to the FIG. 4. Further, it is important to note that certain features are taught herein as being software in local storage 217; however, this functionality may be performed in software, hardware, firmware, or any combination thereof.

Figure 3:
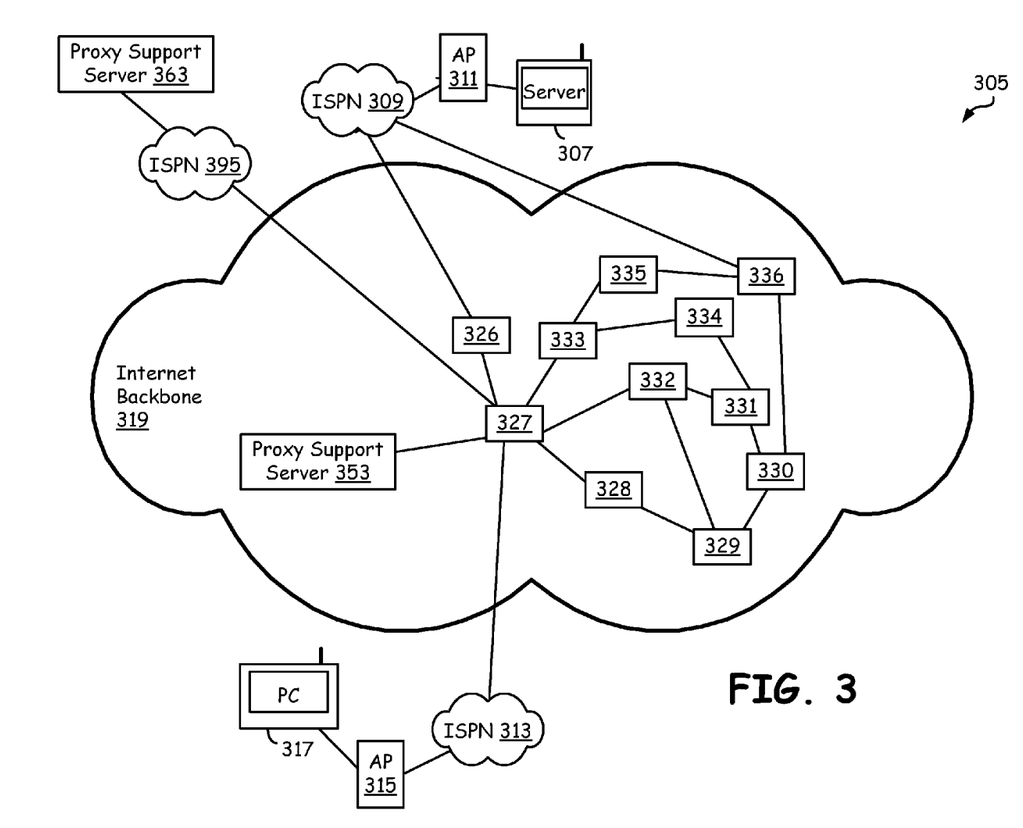
FIG. 3 is another schematic block diagram illustrating an Internet infrastructure containing at least one client device, at least one server and at least one proxy support server are communicatively coupled to an Internet backbone, wherein the proxy support server(s) register the client device and perform malware screening on behalf of the client device.

FIG. 3 is another schematic block diagram illustrating an Internet infrastructure 305 containing a client device 317, server 307, and proxy support servers 353, 363 communicatively coupled to an Internet backbone 319, wherein the proxy support server(s) 353, 363 register the client device 317 and perform malware screening on behalf of the client device 317. In this embodiment, recipient devices (client devices) such as a personal computer 317 registers with a proxy server to enable proxy mode malware screening with a screening server (proxy support server) such as one or more of servers 353 or 363 in FIG. 3. All browser requests from the client device 317 may pass serially (before provision to the destination), in parallel (in tandem with provision to the destination), or after provision to the destination (an after-receipt data forwarding operation) to the screening server 353 and/or 363 for encapsulation and delivery to a source device such as the server 307.

When the source device/server 307 responds with a delivery, that delivery flows to the screening server (proxy functionality) 353 or 363, again either in series, tandem, or after provision to the destination. The screening server 353 or 363 then analyses the received delivery and, if clean, forwards the data to the client device 317 or authorizes the content for release from quarantine or other safe storage if already present at the client device. The analysis may occur on a packet-by-packet basis using either a two packet buffered analysis or a two comparison word analysis of a single packet. If a hit is detected thereby indicating the presence of malware, various delivery options, quarantine, corrective measures, and/or download/upload termination/destruction can occur. Hit detection communications may flow to both the source and recipients, or one of them. One or more of the screening server 353 or 363 screens the packets of the download for malware and sends warning messages with optional human challenge mechanisms if malware codes are detected. Again, any detected malware code might be virus codes or virus bit sequences, adware codes or adware bit sequences, spyware codes or spyware bit sequences, worm codes or worm bit sequences, Trojan horse codes or Trojan horse bit sequences, illegal contents and distribution, or any combination thereof in any quantity.

In FIG. 3, an Internet backbone 319 is illustrated as containing a plurality of network nodes such as 326 through 336. And in addition the Internet backbone, FIG. 3 supports a plurality of proxy support servers such as the servers 363 via ISPNs such as ISPNs 395, or directly such as server 353 in FIG. 3. The client device 317 is connected to the Internet backbone 319 via an ISPN (Internet Service Provider's Network) 313 and AP (Access Point) 315 or some other conventional connection mechanism. Similarly, the source device 307 (the server which the client desires to communicate back and/or forth with) is connected to the Internet backbone 319 via an ISPN 309 and AP 311.

Figure 4:
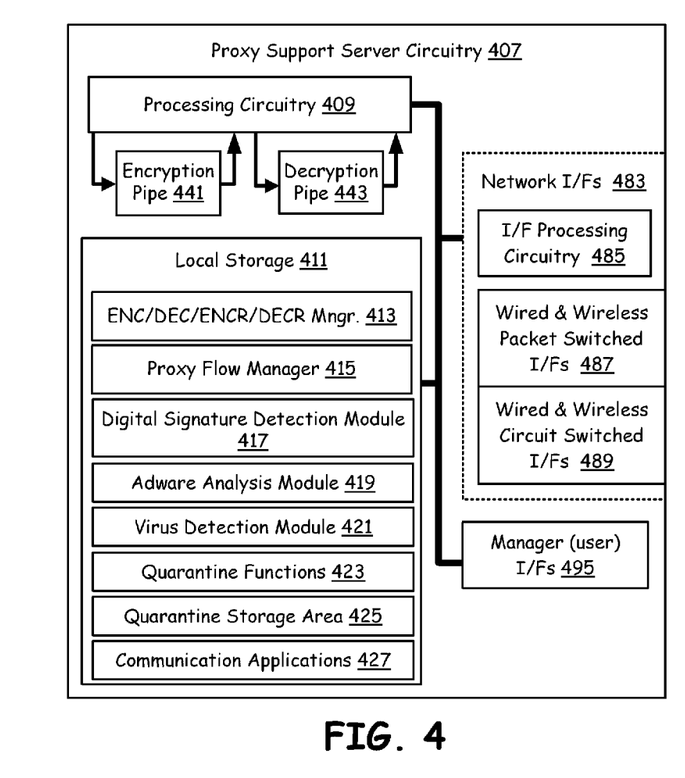
FIG. 4 is a schematic block diagram illustrating components of the proxy support server(s) constructed in accordance with the embodiment of FIG. 3.

FIG. 4 is a schematic block diagram illustrating components of the proxy support server(s) (similar to server(s) 169 of FIG. 1) constructed in accordance with the embodiment of FIG. 3 of the present invention. The support server circuitry 407 may in part or in full be incorporated into any computing device that is capable of serving as an Internet based server. The support server circuitry 407 generally includes processing circuitry 409, local storage 411, manager interfaces 495, and network interfaces 483. These components communicatively coupled to one another via one or more of a system bus, dedicated communication pathways, or other direct or indirect communication pathways. The processing circuitry 409 may be, in various embodiments, a microprocessor, one or more CPUs, a digital signal processor, one or more graphics processing units, a state machine, an application specific integrated circuit, a field programming gate array, other processing circuitry, or any combination thereof. The processing circuitry 409 is communicatively coupled to an encoding/encryption pipe 441, a decoding/decryption pipe 443. These hardware components 441 and 443 may be hardwired to increase the speed of encryption and decryption or may be any combination of hardware, firmware, and/or software in other embodiments.

Local storage 411 may be any random access memory, any read-only memory, flash memory, a disk drive, an optical drive, or any another type of computer-useable memory that is operable to store computer instructions and data. The local storage 411 includes encryption/decryption and/or encoding/decoding (ENC/DEC/ENCR/DECR) manager 413 and, a public and private key pair registry (not shown specifically in FIG. 4). The storage 411 further includes a proxy flow manager 415, to handle encrypted and packetized files that arrive at the proxy support server 407. The proxy flow manager 415, in various embodiments, may also perform the functions of a proxy server and request encrypted files on behalf of a client device.

The local storage 411 also contains virus detection module 421 that detects malware codes or malware bit sequences in the incoming packets. If malware is detected, appropriate quarantine, repair, deletion, or like functions 423 are applied. The communication applications 427 allow messages and human challenge processes to be displayed on the screen of the client device or source device, such as a popup window within or without a browser. Similarly, local storage 411 also contains adware analysis module 419 that analyses incoming packets and identifies and confirms adware codes or adware bit sequences or spyware bit sequences. A dedicated quarantine storage area 425 allows various malware-containing packets to be quarantined temporarily until cleared of malware or deleted or permanently quarantined if malware is found. A digital signature detection module 417 identifies authenticated and trusted packets by verifying the digital signature and the system may bypass these trusted packets around the screening process to save processing time, power, resources, etc.

The network interfaces 483 contain wired and/or wireless packet switched interfaces 487, wired and/or wireless circuit switched interfaces 489. In addition, the network interfaces 483 may also contain built-in or an independent interface processing circuitry 485. The network interfaces 483 allow network devices to communicate with other network devices and allow processing circuitry 409 to receive and send packets, which may contain malware code sequences. The manager interfaces 495 may include a display and keypad interfaces or user interaction with the system. These manager interfaces 495 allow the user at the network exchanges to control aspects of the system of FIG. 4.

In other embodiments, the proxy support server 407 of the present invention may include fewer or more components than are illustrated as well as lesser or further functionality. In other words, the illustrated proxy support server is meant to merely offer one example of possible functionality and construction in accordance the embodiments taught herein.

Figure 5:
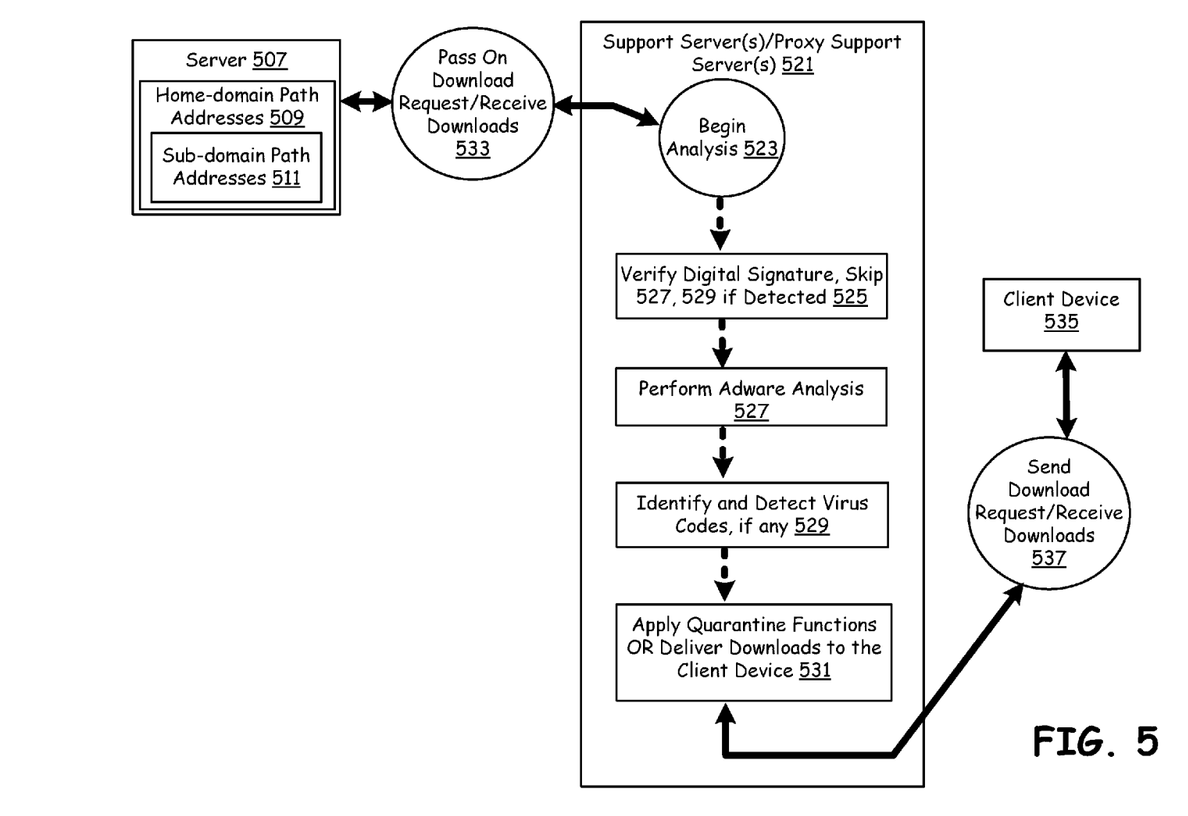
FIG. 5 is a schematic block diagram illustrating events that occur during an upload or download between the client device and server of FIG. 1, wherein the support server(s) or proxy support server(s) perform malware screening.

FIG. 5 is a schematic block diagram illustrating events that occur during an upload or download between the client device 535 and server 507 (similar to client device 153 and server 151 of FIG. 1), wherein the support server(s) or proxy support server(s) 521 similar to support server(s) 169 of FIG. 1) perform malware screening. The server 507 may be server clusters containing home-domain path files 509 and sub-domain path files 511. Downloads (or uploads) may be performed to transfer content, data, files, attachments, web pages, media, etc.

The event begins with the client device 535 sending download requests 537 via the support server(s) or proxy support server(s) 521 or on parallel thereto. The support server(s) or proxy support server(s) 521 pass on the request 533 to the server 507. In response, the support server(s) or proxy support server(s) 521 receive downloads. The support server(s) or proxy support server(s) 521 begin analysis of these downloads in a step 523 of FIG. 5.

Initially, the support server(s) or proxy support server(s) 521 verify digital signature 525 used in conjunctions with the download. A digital signature is a prior authenticated signature that is attached with the download in some fashion. The digital signature may be authenticated and attached to the transmitted data by the support server(s) or proxy support server(s) 521 or some other trusted servers. The digital signatures indicate that the download was previously analyzed for malware and that there is no need to reanalyze these malware-clean files, pages or attachments in the event that these files, pages or attachments have not changes since the time stamp of the digital signatures. In such cases where a digital signature is attached to the packets, the support server(s) or proxy support server(s) 521 may bypass the packets around malware screening 525. In other embodiments, the system may still perform some top-level and critical malware detection or a full malware scan, but such is often not required when the signature is validated. The support server(s) or proxy support server(s) 521 merely check the packets for digital signature that ensure that the packet contents are not changed since the digital signature is attached, and the file should be clear of all malware given the prior processing. Any revisions of the downloaded content would be detected when the servers went to verify the signature during the download process and the detection of data/file changes or the failing of the checksums or signatures would trigger a reset in the digital signature and prompt more malware processing.

After step 525, the support server(s) or proxy support server(s) 521 perform adware analysis 527, as a part of malware screening. Next, the support server(s) or proxy support server(s) 521 identify and detect virus codes, if any, in a step 529. The virus and adware analysis steps 527 and 529 in general may include virus bit sequences, adware bit sequences, spyware bit sequences, worm bit sequences, Trojan horse bit sequences, and illegal contents and distribution. After steps 527 and 529 complete, the support server(s) or proxy support server(s) 521 apply quarantine functions 531 and quarantine downloads when a malware bit sequence is detected. In some embodiments, the discovery of malware ensures that the entire transmission is quarantined, whereas in other embodiments, only contaminated portions or packets of the transmission need to be quarantined or repaired. If no malware bit sequences are found, the download is sent to the client device 531 by releasing it from the protected quarantined space. The client device 535 receives the requested download (web pages, files or attachments) 537 after being screened for malware. A similar event flow is applicable for upload from the client to the server, and malware detection with quarantine can be performed server-side, client-side, server side, and client side with the aid of support servers, or in some hybrid of the foregoing options.

Figure 6:
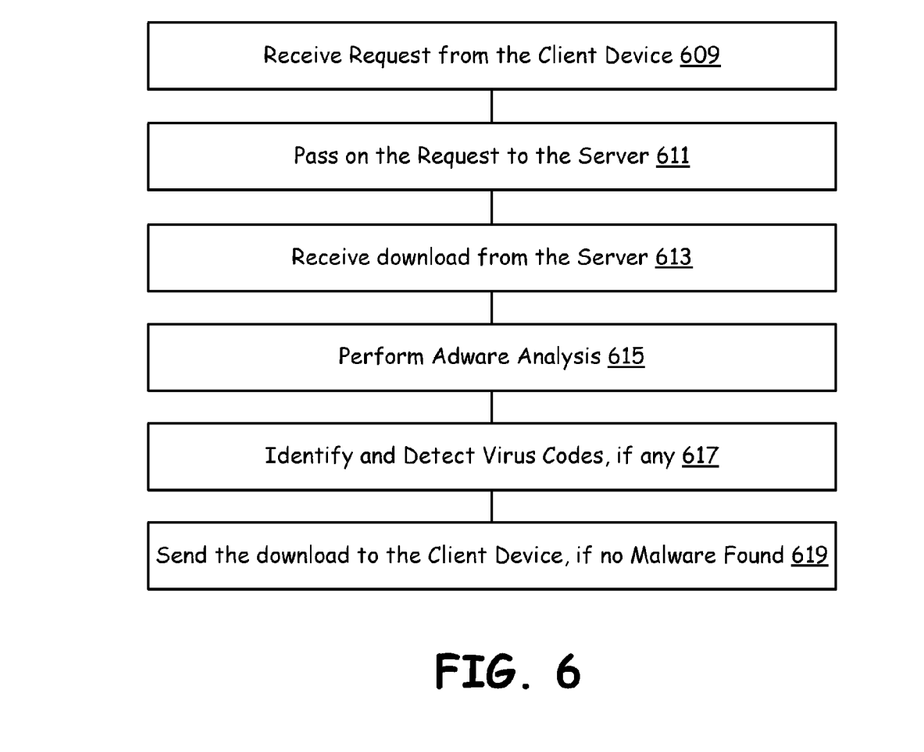
FIG. 6 is a flow diagram illustrating functionality of the support server(s) of FIG. 1 during a download.

FIG. 6 is a flow diagram illustrating functionality of the support server(s) of FIG. 1 during a download operation performed by the system shows in FIG. 1. The functionality of the support server(s) begins at a block/step 609, where the support server(s) receives request from the client device for a download or other similar transaction with a server. The support server(s) pass on the request to one or more servers at a next block 611, and sometimes a serial chain of servers needs to be accessed before identifying and accessing the server that actually has the content requested by the client device.

Via a next block/step 613, the support server(s) receive web pages or files (as downloaded) from the server that contains the desired content. The download may be clean or may contain one or more of virus bit sequences, adware bit sequences, spyware bit sequences, worm bit sequences, Trojan horse bit sequences, and illegal contents and distribution. To perform malware screening, the support server(s) initially perform adware analysis to detect adware, spyware, or illegal content bit sequences, at a next block 615.

At a next block 617, the support server(s) identify any detect virus codes that may be present. The virus codes may include bit sequences of virus, worms, Trojan horses or any other malware. At a next block 619, the support server(s) quarantine the packets or the entire media/content/program containing malware and deliver the partial content, repaired content, partial web pages or corrected files to the client device if possible. If no malware bit sequences are found, then the downloaded content may be freed to main memory and unfettered access to the OS and the client side system without concern, as malware is likely not present. A similar method (blocks 609 through 619) is applicable for upload from the client to the server as well.

Figure 7:
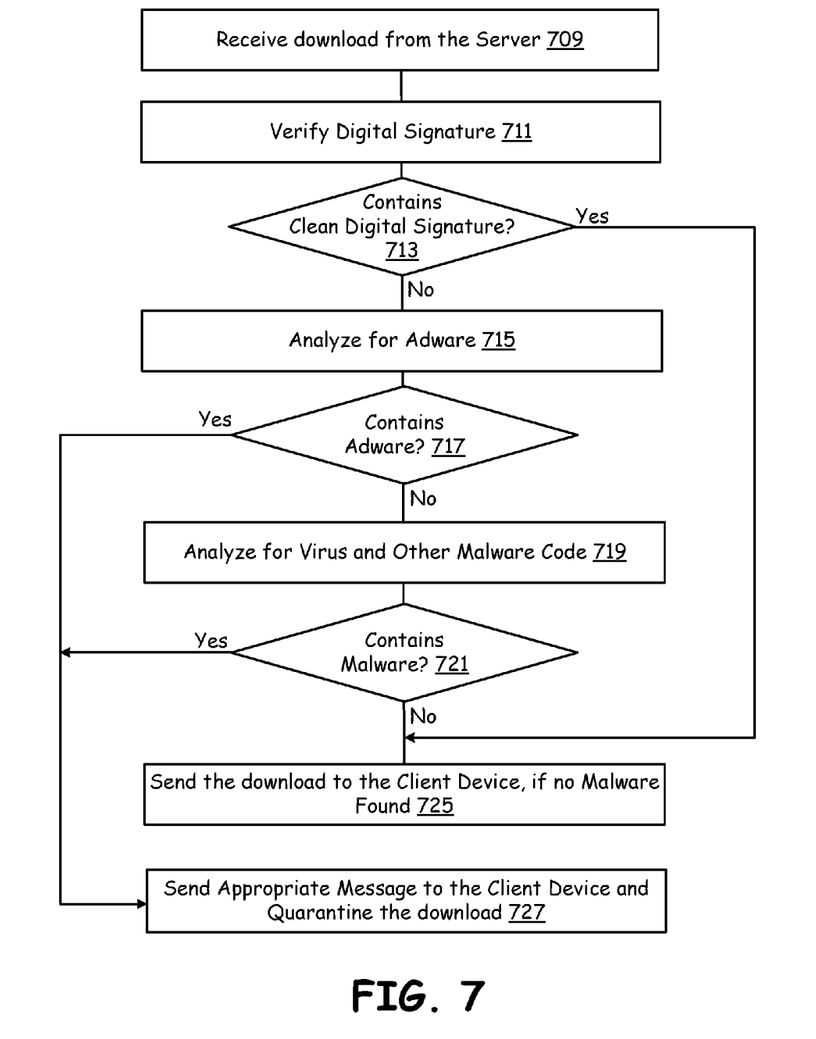
FIG. 7 is a flow diagram illustrating functionality of the support server(s) of FIG. 1, in more detail.

FIG. 7 is a flow diagram illustrating functionality of the support server(s) 169 of FIG. 1, in more detail. At a block/step 709, the support server(s) receive a request for a web page or file download from a source or a client device. At a next block/step 711, the support server(s) verify a digital signature for the transmission, if a digital trusted source signature is present. The digital signature is a prior authenticated signature that is attached with the files by a trusted or malware-protected source. The presence of a digital signature indicates that the downloaded content/data was previously analyzed by approved malware security software and that the files were deemed malware-free so that there is no need to reanalyze these clean files, pages or attachments provided the data, files, content has not been changed since the last malware signature scan. The digital signatures may be attached to the downloadable content by the support server(s) or some other trusted servers.

At a next decision block/step 713, the authenticity of digital signatures is verified by the support server(s). If the download contains a valid and authentic digital signature, then at a next block/step 725, the support server(s) send web pages or files to the client device without a need for extensive additional malware processing. If no digital signature is present, the malware screening is continued at a next block/step 715, by analyzing for adware. The adware analysis may include detection of adware bit sequences, spyware bit sequences and illegal contents and distribution.

At a next decision block/step 717, the web pages or files are scanned to determine if they contain adware. If adware is found, at a next block/step 727, the support server(s) send an appropriate message to the client device and quarantines an appropriate portion of the malware-infected web page or files. If the user of the client device or an IT professional overseeing the system sets the configuration at the support server(s) a certain way or clears the transmission through human override or intervention, that adware may be allowed to pass through.

If no adware is detected at decision block/step 717, the support server(s) analyzes the data for virus and other malware codes, at a next block 719. The virus analysis may include detection of one or more of virus bit sequences, worm bit sequences and/or Trojan horse bit sequences. It is important to note that while FIG. 7 shows malware, virus, and adware/spyware scanning as being performed sequentially, there is no reason why simultaneous real-time or post-download scanning for all such malware cannot occur in parallel in quarantine space or similar safe memory spaces by one or more processors or CPUs. At a next decision block/step 721, the support server(s) verify if the web pages or files contain any virus bit sequences, worm bit sequences and/or Trojan horse bit sequences.

If viral content is found the support server(s) send an appropriate message to the client device and quarantines the web page or files via a block/step 727. A human challenge may also be initiated or provided in both the cases of adware detection or virus code detection to the user of the client devices or to an IT professional overseeing the system. If no viral content is found at the decision block/step 721, then at the next block/step 725, the support server(s) send web pages or files to the client device or free such content from the quarantine space if possible. A similar method (blocks/steps 709 through 727) is applicable for upload from the client device or other devices to the server as well.

Figure 8:
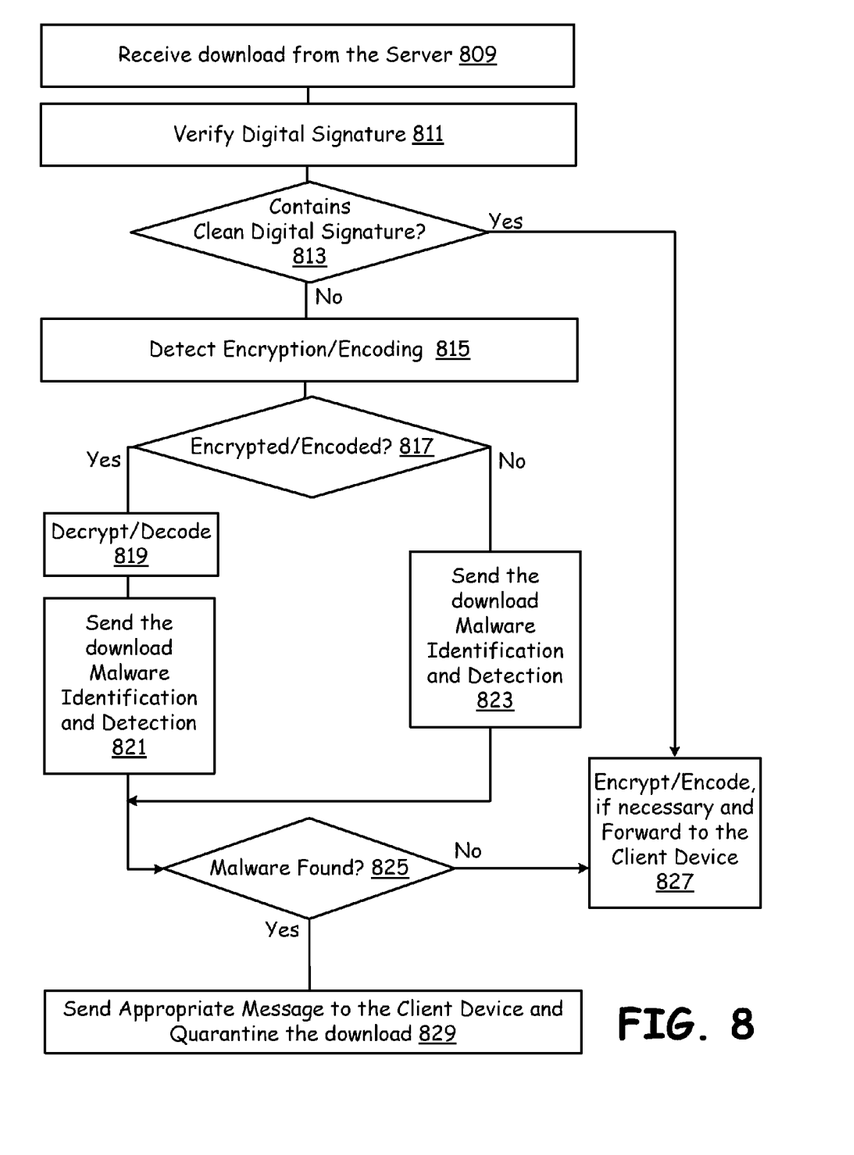
FIG. 8 is a flow diagram illustrating functionality of the support server(s) of FIG. 1 during a download, wherein the support server(s) of FIG. 1 verify for a digital signature before malware screening is performed and decrypts the files if the files are encrypted.

FIG. 8 is a flow diagram illustrating the functionality of the support server(s) of FIG. 1 during a download operation wherein the support server(s) of FIG. 1 verifies a digital signature before malware screening, and decrypts the files if the transmitted files are encrypted. At a block/step 809, the support server(s) (e.g., support sever(s) 169 in FIG. 1) receive a web page or file download request. At a next block/step 811, the support server(s) seek and receive a digital signature and verify that digital signature if it is available. At a next decision block/step 813, the support server(s) verify if a clean digital signature is attached with the download. If a clean digital signal is found, then the support server(s) encrypt/encode the download if necessary, and forward the download to the client device in a block/step 827.

At a next block/step 815, if a clean digital signature is not attached at the decision block 813, the support server(s) detect the presence of any encryption protocols or encoded content. At a next decision block 817, the support server(s) determine whether the download is encrypted/encoded. If no encryption or encoding has been performed, then the support server(s) send the downloaded content through malware identification and detection operations in a block/step 823. The malware that is scanned for may include virus bit sequences, adware bit sequences, spyware bit sequences, worm bit sequences, Trojan horse bit sequences, and illegal contents and distribution.

If encrypted or encoded content is found at the decision block 817, the support server(s) decrypt/decode that content to create decrypted or normal content via a next block/step 819. At a next block/step 821, the support server(s) send the decrypted download through malware identification and detection operations. At a next decision block/step 825, the support server(s) verify if malware is found. If no malware is found, then the support server(s) encrypt/encode the download if necessary and forward the download to the client device via a block/step 827.

If malware is found at the decision block/step 825, then the support server(s) send an appropriate warning message to the client device or other affected devices and quarantine the download, or engage in malware-correcting efforts on the infected code/data. The warning message may also contain a human challenge mechanism, if appropriate, and the passing of a human challenge may allow downloading of the web pages or files to the client device even if malware may have been detected by the system. Basically, the passing of a human challenge may be used to override the determination of the system with respect to malware. In addition, the support server(s) may have a specified quarantine area to quarantine downloads while processing or to quarantine viral code indefinitely An IT professional or the user of the client device may later be able to access or download content from quarantined areas later if necessary, by passing human challenge questions or by accessing the area using secure tools/applications. A similar method (similar to blocks 809 through 829) is applicable for uploading encrypted or encoded content to the server as well. Also, while FIG. 8 illustrates that decryption only occurs in a certain place or in a certain order, for security reasons or efficiency reasons, encryption and decryption may be performed at different times or in different sequences than that shown in FIG. 8.

Figure 9:
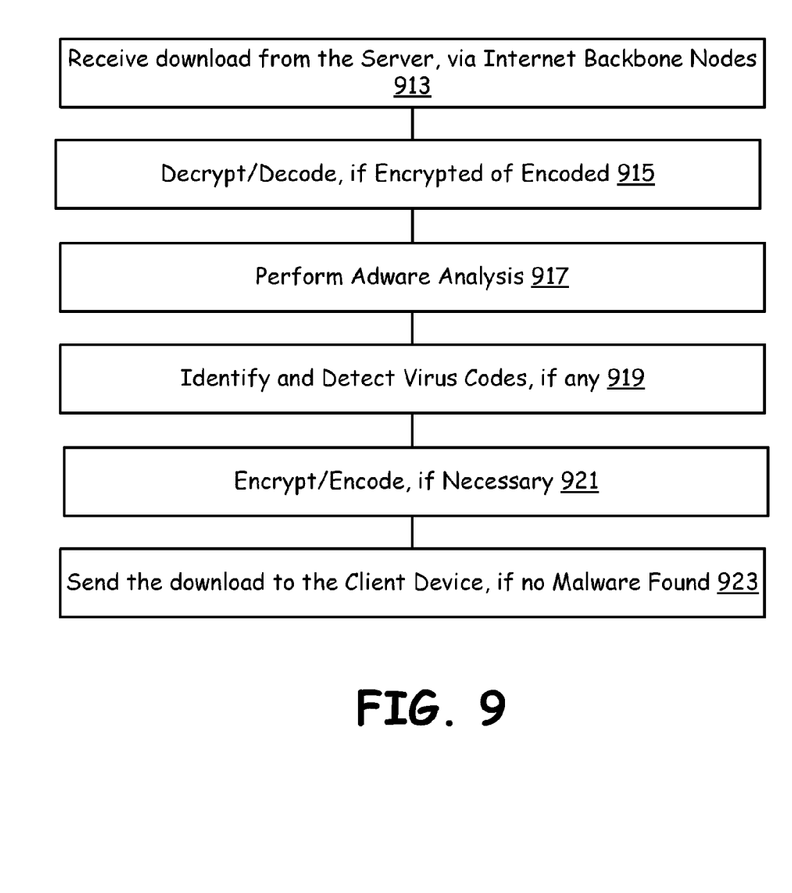
FIG. 9 is a flow diagram illustrating the functionality of the proxy support server(s) of FIG. 3 during a download, after the client device registration with the proxy support server(s) is complete.

FIG. 9 is a flow diagram illustrating the functionality of the proxy support server(s) of FIG. 3 during a download, after the client device is registered with one or more proxy support server(s). The functionality of the proxy support server(s) begin at a block/step 913, after successful registration of the client device by the user, and then the client device sends a request for a web page or file download via the step 913.

The proxy support server(s) or screening servers(s) (e.g., see server 169 of FIG. 1) also perform the function of malware detection for downloading and uploading to and from clients, and to do so, the client device needs to register with the proxy support server(s) only once prior to utilizing the services of the proxy support server(s). After registration, all of the requests for download of web pages and files are routed in series or parallel through the proxy support server(s) for malware detection so that the client device gets the download screened for malware in a proxy mode. All browser requests of the client device from then onwards will preferably pass through the screening server(s) for eventual encapsulation and delivery to the server, and vice versa when the server provides content to the client.

At a next block/step 915, the proxy support server(s) decrypt/decode the packets of the download if the data is encrypted/encoded. At a next block/step 917, the proxy support server(s) perform adware analysis. The adware analysis as a part of malware screening may include detection of adware, spyware, or illegal content bit sequences. At a next block/step 919, the proxy support server(s) identify and detect virus codes, if any are known and present. This analysis may include detection of virus bit sequences, worm bit sequences and Trojan horse bit sequences.

At a next block/step 921, the proxy support server(s) encrypt/encode the packets of the download if they were decrypted/decoded to enable proper analysis. At a next block/step 923, the proxy support server(s) send web pages or files to the client device if no malware is found or if malware was found but could be safely removed or remedied. Alternatively, if malware is found, the proxy support server(s) send appropriate warning message to the client device and quarantines the download. The warning message may also contain or allow for a human challenge mechanism. Passing of the human challenge mechanism, in certain cases, may allow the proxy support server(s) deliver the download even though it contains some form of malware. A similar method (blocks 913 through 923) is applicable for upload from the client to the server as well.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may modify the information of a signal in non-material ways or may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the claimed invention is not limited to such embodiments. It will be obvious to one of average skill in the art that various changes and modifications may be practiced within the spirit and scope of the invention, as limited only by the scope of the appended claims.

The invention claimed is:

1. A method used by malware support server system in a network that includes a plurality of client devices and a plurality of host servers, the malware support server system having a network address, the method comprising:
   receiving a first portion of a plurality of data packets, each of the plurality of data packets having the network address as a destination address, and each of the plurality of data packets including both an intended destination address and a source address;
   determining, while engaged in receiving at least some of the plurality of data packets, that the first portion is malware-free;
   upon determining that the first portion is malware-free, swapping the network address with the intended destination address in the first portion to create a modified first portion of the plurality of data packets;
   sending the modified first portion;
   receiving a second portion of plurality of data packets;
   determining, while engaged in receiving at least some of the plurality of data packets, that the second portion is not malware-free; and
   at least assisting in terminating delivery of the plurality of data packets.

2. The method of claim 1, wherein the first portion is delivered to the malware support server system by one of a first host server of the plurality of host servers and a first device of the plurality of client devices, and further comprising establishing a proxy relationship with at least one of the first device and the first host server.

3. The method of claim 1, wherein the at least assisting in terminating delivery comprises withholding delivery of at least one of the plurality of data packets.

4. The method of claim 2, wherein the at least assisting in terminating delivery comprises sending an indication that malware has been detected to at least one of the first host server and the first device.

5. The method of claim 1, wherein the plurality of data packets comprise Internet data involved in an exchange between an Internet browser associated with one of the plurality of client device and one of the plurality of host servers.

6. A malware support server system in a network that includes a plurality of client devices and a host server, the malware support server system comprising:
   a communication interface having a network address;
   a processing infrastructure, coupled to the communication interface, that is operable to:
   register each of the plurality of client device as member devices;
   receive via the communication interface a proxy request from a first client device of the plurality of client devices for a plurality of streamed data packets that are available from the host server;
   send via the communication interface a forwarded request for the plurality of streamed data packets to the host server, the forwarded request including the network address;
   analyze, while engaged in receiving at least some of the plurality of data packets, a first portion of the plurality of streamed data packets received via the communication interface from the host server, conclude that the first portion is malware-free, upon concluding that the first portion is malware-free, replacing the network address of the first portion with a destination address of the first device, and forward the first portion to the first device; and
   analyze, while engaged in receiving at least some of the plurality of data packets, a second portion of the plurality of streamed data packets received via the communication interface from the host server, determine that the second portion contains malware data, and at least assist in terminating delivery of the plurality of streamed data packets.

7. The malware support server system of claim 6, wherein the at least assisting in terminating delivery comprises withholding delivery of at least one of the plurality of data packets.

8. The malware support server system of claim 6, wherein the at least assisting in terminating delivery comprises sending an indication that malware has been detected to at least one of the host server and the first device.

9. The malware support server system of claim 6, wherein the plurality of data packets comprise Internet data requested by an Internet browser of the first device.

10. The malware support server system of claim 6, wherein the processing infrastructure is further operable to at least assist in a quarantine process.

11. The malware support server system of claim 6, wherein the processing infrastructure is further operable to at least support malware removal.

12. A malware support server system in a network that includes a plurality of client devices and a plurality of host servers, the malware support server system comprising:
   a communication interface having a network address;
   a processing infrastructure, coupled to the communication interface, that operates as a proxy device between a first host server of the plurality of host servers and a first device of the plurality of client devices to perform malware detection analysis of a real time stream of packets originating from at least one of the first host server and the first device; and
   the processing infrastructure delivering, via the communication interface, to at least one of the first host server and the first device mid-stream malware detection indications when malware is detected.

13. The malware support server system of claim 12, wherein the processing infrastructure withholds delivery of at least one packet of the real time stream of packets.

14. The malware support server system of claim 12, wherein the processing infrastructure at least assists in a mid-stream termination of delivery of the real time stream of packets.

15. The malware support server system of claim 12, wherein the real time stream of packets comprise Internet data involved in an exchange between the first host server and an Internet browser associated with the first device.

16. The malware support server system of claim 12, wherein malware assistance is provided via malware related software running on the first device.

17. The malware support server system of claim 12, wherein the processing infrastructure is further operable to at least assist in a quarantine process.

18. The malware support server system of claim 12, wherein the processing infrastructure is further operable to at least support malware removal.

19. The malware support server system of claim 12, wherein malware assistance is provided via malware related software running on the first host.

20. The malware support server system of claim 12, wherein the processing infrastructure supports a packet exchange between a second host server of the plurality of host servers and a second device of the plurality of client devices by receiving a verified indication that content of the packet exchange is malware free.

* * * * *